United States Patent
Wang

(10) Patent No.: US 10,132,623 B2
(45) Date of Patent: Nov. 20, 2018

(54) METHOD FOR MEASURING SLANT WALL THICKNESS DIMENSION OF HUB

(71) Applicant: CITIC Dicastal CO., LTD, Qinhuangdao (CN)

(72) Inventor: Haiyi Wang, Qinhuangdao (CN)

(73) Assignee: CITIC Dicastal CO., LTD, Qinhuangdao (CN)

(*) Notice: Subject to any disclaimer, the term of this patent is extended or adjusted under 35 U.S.C. 154(b) by 203 days.

(21) Appl. No.: 15/336,219

(22) Filed: Oct. 27, 2016

(65) Prior Publication Data

US 2017/0122718 A1    May 4, 2017

(30) Foreign Application Priority Data

Oct. 30, 2015 (CN) .......................... 2015 1 0726887

(51) Int. Cl.
| | |
|---|---|
| *G01B 5/004* | (2006.01) |
| *G01B 21/04* | (2006.01) |
| *G01B 21/08* | (2006.01) |
| *G01B 5/00* | (2006.01) |

(52) U.S. Cl.
CPC ............ *G01B 21/04* (2013.01); *G01B 5/0025* (2013.01); *G01B 21/08* (2013.01)

(58) Field of Classification Search
CPC ....... G01B 21/04; G01B 5/0025; G01B 21/08
USPC .................................................. 33/203, 503
See application file for complete search history.

(56) References Cited

U.S. PATENT DOCUMENTS

| | | | | |
|---|---|---|---|---|
| 5,398,419 A | * | 3/1995 | Schmidt, Jr. ......... | G01B 5/0025 33/203 |
| 5,452,606 A | * | 9/1995 | Castelnuovo .......... | G01B 5/255 33/203 |
| 6,282,799 B1 | * | 9/2001 | Warkotsch ............. | G01B 5/255 33/203 |

(Continued)

*Primary Examiner* — G. Bradley Bennett
(74) *Attorney, Agent, or Firm* — Howard IP Law, PLLC; Jeremy Howard

(57) ABSTRACT

The invention provides a method for measuring a slant wall thickness of a hub. Specifically, the hub is laid flatwise on a detection platform of a three-coordinate measuring machine; afterwards, a first inner wall point 1 and a second inner wall point 2 are sampled from an inner rim slant of the hub along a YZ axial section of the three-coordinate measuring machine, and X-axis coordinate values of the two points are set to zero to establish a first Cartesian coordinate system; the two points defined in step 101 are connected and configured into an axial line of a rim wall thickness; a second Cartesian coordinate system is established with a direction of the axial line of the rim wall thickness as a Y' axis; an inner rim wall thickness point 3 from an inner rim wall, and an outer rim wall thickness point 4, both having X' values of zero, are sampled; a two-dimensional distance between the inner rim wall thickness point 3 and the outer rim wall thickness point 4 in a Z' axis is calculated under the second coordinate system and recorded as a measured slant wall thickness value of the hub. The method provided by the present invention has the advantages of avoiding the situation that the three-coordinate measuring machine has a large error in measuring a rim wall thickness due to the use of the detection platform as a benchmark, improving the accuracy of detection, and providing the basis of automated rim thickness detection.

3 Claims, 2 Drawing Sheets

(56) References Cited

U.S. PATENT DOCUMENTS

| | | | |
|---|---|---|---|
| 2003/0159298 A1* | 8/2003 | Mieling | G01B 5/255 33/203.15 |
| 2006/0028638 A1* | 2/2006 | Douglas | G01M 1/26 356/139.09 |
| 2011/0146089 A1* | 6/2011 | Gray | G01B 5/255 33/288 |
| 2013/0239420 A1* | 9/2013 | Kroll | G01B 11/275 33/228 |
| 2016/0368332 A1* | 12/2016 | Liu | G01L 17/00 |

* cited by examiner

METHOD FOR MEASURING SLANT WALL THICKNESS DIMENSION OF HUB

This application claims priority from CN 201510726887.7, filed on Oct. 30, 2015, the entire content of which is incorporated herein by reference.

FIELD OF THE INVENTION

The present invention relates to the field of industrial measurement, and in particular to a method for measuring a slant wall thickness of a hub.

BACKGROUND OF THE INVENTION

After the completion of hub production, it is required to measure the dimension of each part of a hub to determine whether the hub product is in accordance with the designed dimensions. The wall thickness of a hub is an important hub dimension parameter. Insufficient wall thickness of a hub will result in influence on the strength of the hub.

In dimension control on a semi-finished hub product, a slant wall thickness, as a key dimension to be guaranteed, needs to be mainly monitored. However, an inspector usually made manual measurement using a wall thickness caliper (one type of vernier caliper) at a platform detection station in the past. A conventional vernier caliper has the disadvantages of large human errors, low measurement efficiency and the like in measuring the slant wall thickness dimension of hubs. For this reason, it is developed that a three-coordinate measuring machine is used to measure the wall thickness dimension of hubs, intended to effectively avoid the disadvantages of manual measurement. Nevertheless, it is widely believed in the relevant art that the measurement of the slant wall thickness dimension using the three-coordinate measuring machine has the issue of low accuracy and thus is not good enough to replace the method using the vernier caliper. There is an urgent need at present for a method for measuring the slant wall thickness of a hub that may be high in accuracy and convenient to operate.

SUMMARY OF THE INVENTION

Hence, the present invention aims at providing a method for measuring a slant wall thickness of a hub.

In order to achieve the above objective, the present invention follows the idea below.

In one aspect of the present invention, provided is a method for measuring a slant wall thickness of a hub, which is characterized by comprising: a step 101, flatwise laying the hub on a detection platform of a three-coordinate measuring machine, orderly sampling two points, which are named as a first inner wall point (1) and a second inner wall point (2), from an inner rim slant of the hub along a YZ axial section of the three-coordinate measuring machine, and setting X-axis coordinate values of the two points to zero, thus establishing a first coordinate system, namely a Cartesian coordinate system; a step 111, connecting and configuring the first inner wall point (1) and the second inner wall point (2) defined in the step 101 into a three-dimensional straight line, which is named as an axial line of a rim wall thickness; a step 121, establishing a second coordinate system, namely a Cartesian coordinate system, with a direction of the axial line of the rim wall thickness as a Y' axis; a step 131, sampling an inner rim wall thickness point (3) from an inner rim wall and an outer rim wall thickness point (4) from an outer rim wall, and setting X' values of the inner and outer rim wall thickness points to zero; and a step 141, calculating a two-dimensional distance between the inner rim wall thickness point (3) and the outer rim wall thickness point (4) in a Z' axis under the second coordinate system and recording the distance as a measured slant wall thickness value of the hub.

In a preferred aspect of the present invention, the method further comprises a step 122 between the step 121 and the step 131: regulating the coordinate system back to the second coordinate system after other measurement and coordinate system regulation take place after the step 121.

In a preferred aspect of the present invention, in the step 131, a direction of sampling the inner rim wall thickness point (3) and the outer rim wall thickness point (4) is a direction along the Z' axis under the second coordinate system.

In another aspect of the present invention, the method comprises the following steps: step 101, the hub is laid flatwise on the detection platform of the three-coordinate measuring machine; two points, which are named as the first inner wall point (1) and the second inner wall point (2), are orderly sampled from the inner rim slant of the hub along the YZ axial section of the three-coordinate measuring machine, and the X-axis coordinate values of the two points are set to zero, thus establishing the first coordinate system, namely the Cartesian coordinate system. Step 111, the first inner wall point (1) and the second inner wall point (2) defined in the step 101 are connected and configured into the three-dimensional straight line, which is named as the axial line of the rim wall thickness. Step 121, the wall thickness is measured on a slant wall that is neither perpendicular nor parallel to a first coordinate axis, during which a stylus is required to keep perpendicular to the slant wall while sampling points, and then a coordinate system parallel to the slant wall is established, and named as a "rim wall thickness coordinate system" (the "axial line of the rim wall thickness" is rotated to the coordinate axis Y+). An inclination angle of the slant wall of a real workpiece is defined as a variable DX and a vector direction of sampling points from the slant wall is defined as a variable DY, allowing DX⊥LDY. In this way, it can be guaranteed that the vector direction of sampling points is perpendicular to a certain coordinate axis, thus avoiding the generation of an error in the vector direction. Step 122: since it is possible in the procedure to measure other dimensions under other coordinate systems before measuring the outer rim wall thickness point, back regulation to the "rim wall thickness coordinate system" is required. Step 131, a point is sampled from the inner rim and named as the "inner rim wall thickness point" under the rim wall thickness coordinate system. In order to ensure that the point sampling direction of measurement is perpendicular to the inner wall, the vector direction of the point is set to I, J, K (0, 0, −1). Step 132, a point is sampled from the outer rim and named as the "outer rim wall thickness point" under the rim wall thickness coordinate system. In order to ensure that the point sampling direction of measurement is perpendicular to the outer wall, the vector direction of the point is set to I, J, K (0, 0, 1). Step 141, the two-dimensional distance, parallel to the Z coordinate axis, between the "inner rim wall thickness point" and the "outer rim wall thickness point" is calculated under the rim wall thickness coordinate system, i.e., the distance is the rim wall thickness.

The "vector direction" described in above various steps refers to a direction in which the stylus returns after measuring a characteristic in the field of three-coordinate measurement.

The "vector direction" parameters I, J, K (0, 0, −1) and I, J, K (0, 0, 1) in the step 131 and the step 132 refer to cosine values of respective included angles of the straight line of the returning direction of the stylus to the X axis, the Y axis and the Z axis.

The technical solution in the present invention has the advantages of avoiding the situation that the three-coordinate measuring machine has a large error in measuring the rim wall thickness due to the selection of the coordinate system with the detection platform as a benchmark, improving the accuracy of detection, and providing the basis of automated rim thickness detection.

BRIEF DESCRIPTION OF THE DRAWINGS

The embodiments of the present invention will be described below in detail in conjunction of accompanying drawings.

Figure 1:
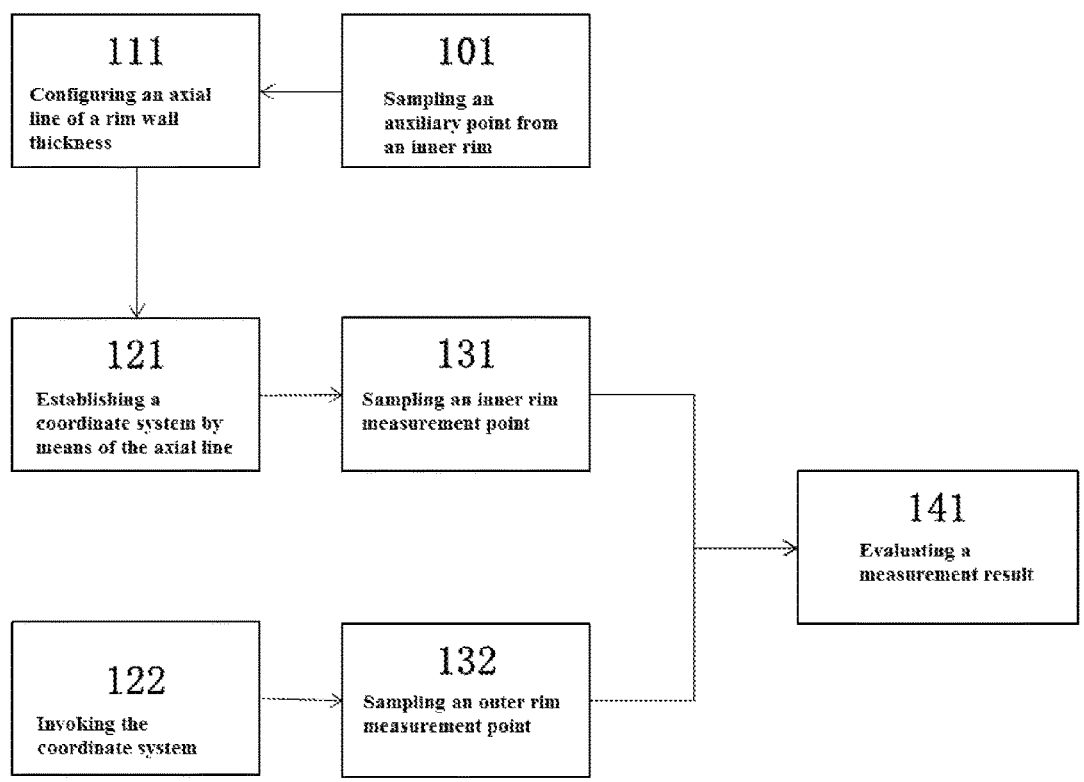
FIG. 1 is a flow diagram of a method for measuring a slant wall thickness of a hub in a first embodiment of the present invention.
Figure 2:
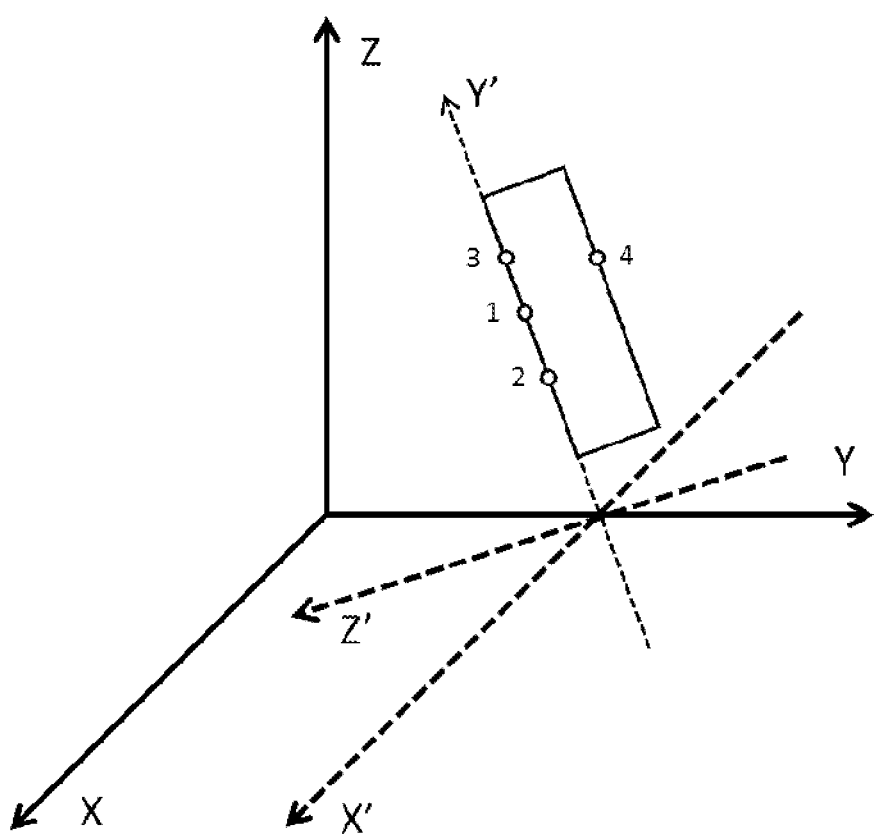
FIG. 2 is a schematic diagram of a first coordinate system, a second coordinate system and measurement point selecting positions in the first embodiment of the present invention.

In the drawings, 1 represents a first inner wall point; 2 represents a second inner wall point; 3 represents an inner rim wall thickness point; 4 represents an outer rim wall thickness point.

DETAILED DESCRIPTION OF EMBODIMENTS

Embodiment 1

The method provided by the present invention is tested in the R&D workshop of Dicastal situated in Qinhuangdao economic and technological development zone. It is intended to realize manpower minimization, reduce the amount of labor of front-line employees (inspectors), improve the measurement accuracy and decrease the measurement temps.

The steps of measurement will be described in detail below.

Step 101, two points, which are named as an "inner wall point 1" and an "inner wall point" 2, are orderly sampled from the inner rim slant of a hub along a YZ axial section of a three-coordinate measuring machine, and the X-axis coordinate values of the two points are set to zero.

Step 111, the two points are configured into a three-dimensional straight line which is named as an "axial line of a rim wall thickness".

Step 121, the wall thickness is measured on a slant wall that is neither perpendicular nor parallel to a coordinate axis, during which a stylus is required to keep perpendicular to the slant wall while sampling points, and then a coordinate system parallel to the slant wall is established, and named as a "rim wall thickness coordinate system" (the "axial line of the rim wall thickness" is rotated to the coordinate axis Y+). An inclination angle of the slant wall of a real workpiece is defined as a variable DX and a vector direction of sampling points from the slant wall is defined as a variable DY, allowing DX⊥LDY. In this way, it can be guaranteed that the vector direction of sampling points is perpendicular to a certain coordinate axis, thus avoiding the generation of an error in the vector direction.

Step 122: since it is possible in the procedure to measure other dimensions under other coordinate systems before measuring the outer rim wall thickness point, back regulation to the "rim wall thickness coordinate system" is required.

Step 131, a point is sampled from the inner rim and named as an "inner rim wall thickness point" under the rim wall thickness coordinate system. In order to ensure that the point sampling direction of measurement is perpendicular to the inner wall, a vector direction of the point is set to I, J, K (0, 0, −1).

Step 132, a point is sampled from the outer rim and named as an "outer rim wall thickness point" under the rim wall thickness coordinate system. In order to ensure that the point sampling direction of measurement is perpendicular to the outer wall, the vector direction of the point is set to I, J, K (0, 0, 1).

Step 141, the two-dimensional distance, parallel to a Z coordinate axis, between the "inner rim wall thickness point" and the "outer rim wall thickness point" is calculated under the rim wall thickness coordinate system, i.e., the distance is the rim wall thickness.

In the steps 131 and 132, it is quite important to set the vector direction parameters of the inner and outer wall measurement points to I, J, K (0, 0, −1) and I, J, K (0, 0, 1). By setting the parameters in such a manner, the stylus is enabled to measure along the direction perpendicular to the slant wall such that the error probability of the measured values is extremely low.

In this embodiment, the method has been practically verified for more than 1 year in the internal test workshop of Dicastal and already put into production use.

By taking a wheel model of an internationally known complete vehicle manufacturer as an example (data unit: mm), the machined semi-finished product of the wheel model has a slant wall thickness tolerance within the range of 4.25-0.2. By using a traditional wall thickness caliper, five inspectors obtain the following data through respective measurement: 4.22, 4.24, 4.18, 4.20, and 4.18, having a measurement extreme difference of 0.06. The wheel model then is measured five times using the three-coordinate measuring machine to obtain the following measurement results: 4.214, 4.214, 4.215, 4.214, and 4.215, having a measurement extreme difference of only 0.001. It thus can be seen that only a tiny repetitive error is present in the three-coordinate measurement of the slant wall thickness.

By taking another wheel model of the internationally known complete vehicle manufacturer as an example (data unit: mm), the machined semi-finished products of the wheel model have a slant wall thickness tolerance within the range of 4-0.2. Direct manual point-sampling measurement is carried out five times under the condition of using the three-coordinate measuring machine without establishing the coordinate system to obtain the following measurement results: 4.236, 4.195, 4.206, 4.188 and 4.157, having a measurement extreme difference of 0.079. Then, measurement is carried out by means of the method of establishing the "wall thickness coordinate system" and setting the vector direction values of the measurement points to obtain the following measurement results: 4.076, 4.077, 4.077, 4.076, and 4.077. It thus can be seen that a large measurement error and quite poor repeatability (because of generally large measurement results of non-perpendicular contact measurement) are present under the condition of using the three-coordinate measuring machine without establishing of the second coordinate system and manual point sampling.

The invention claimed is:

1. A method for measuring a slant wall thickness of a hub, characterized in that, the method comprises a step 101, flatwise laying the hub on a detection platform of a three-coordinate measuring machine, orderly sampling two points, which are named as a first inner wall point (1) and a second inner wall point (2), from an inner rim slant of the hub along a YZ axial section of the three-coordinate measuring machine, and setting X-axis coordinate values of the two points to zero, thus establishing a first coordinate system, namely a Cartesian coordinate system; a step 111, connecting and configuring the first inner wall point (1) and the second inner wall point (2) defined in the step 101 into a three-dimensional straight line, which is named as an axial line of a rim wall thickness; a step 121, establishing a second coordinate system, namely a Cartesian coordinate system, with a direction of the axial line of the rim wall thickness as a Y' axis; a step 131, sampling an inner rim wall thickness point (3) from an inner rim wall and an outer rim wall thickness point (4) from an outer rim wall, and setting X' values of the inner and outer rim wall thickness points to zero; and a step 141, calculating a two-dimensional distance between the inner rim wall thickness point (3) and the outer rim wall thickness point (4) in a Z' axis under the second coordinate system and recording the distance as a measured slant wall thickness value of the hub.

2. The method according to claim 1, characterized in that, further comprising a step 122 between the step 121 and the step 131: regulating the coordinate system back to the second coordinate system after other measurement and coordinate system regulation take place after the step 121.

3. The method according to claim 1, characterized in that, in the step 131, a direction of sampling the inner rim wall thickness point (3) and the outer rim wall thickness point (4) is a direction along the Z' axis under the second coordinate system.

* * * * *